United States Patent [19]

Hill

[11] Patent Number: 5,461,792
[45] Date of Patent: Oct. 31, 1995

[54] NAVIGATION AID WITH BIANGULATION

[75] Inventor: David C. Hill, Oakville, Canada

[73] Assignee: Navitrak Corp., Oakville, Canada

[21] Appl. No.: 271,910

[22] Filed: Jul. 8, 1994

[51] Int. Cl.⁶ .............................. G01C 17/02; G01C 21/20
[52] U.S. Cl. .............................. 33/1 SD; 33/1 SB; 33/352
[58] Field of Search ................................. 33/1 SB, 1 SA,
33/1 SD, 1 CC, 352, 355 R, 364; 359/798,
800, 801, 803, 807, 809, 810, 806

[56]       References Cited
       U.S. PATENT DOCUMENTS

| | | | |
|---|---|---|---|
| 2,210,773 | 8/1940 | Niemeyer | 33/1 SD |
| 2,235,177 | 3/1941 | Stark | 33/1 SD |
| 2,364,731 | 12/1944 | Luck | 33/1 SD |
| 3,094,781 | 6/1963 | Vangor | 33/1 SD |
| 3,373,493 | 3/1968 | McDonald | 33/1 SD |
| 3,643,333 | 2/1972 | Pepper | 33/1 SD |
| 3,844,042 | 10/1974 | Hodge | 33/1 SD |
| 3,983,630 | 10/1976 | Hamm et al. | 33/1 SD |
| 5,060,390 | 10/1991 | Hill | 33/1 SD |
| 5,105,544 | 4/1992 | Ontiveros et al. | 33/1 SD |

Primary Examiner—Thomas B. Will
Attorney, Agent, or Firm—R. Craig Armstrong

[57] ABSTRACT

A navigation device is disclosed, having a lens across an opening at one end of a case, and a compass across an opening at the opposite end of the case. A transparency holder is positioned between the lens and the compass, adapted to receive a map transparency with magnetic north thereon aligning with a north marking on the body of the compass, at a distance from the lens approximating the focal length of the lens. A first grid wheel is provided between the transparency holder and the compass, having a transparent or translucent central area inscribed with parallel grid lines and at least one first directional arrow aligned parallel to the grid lines, the grid wheel being in close proximity to the transparency holder such that it is also at a distance from the lens approximating the focal length of the lens. A second grid wheel is provided immediately adjacent the first grid wheel, and is releasably secured to the first grid wheel for normal rotation therewith, but is readily detachable therefrom for independent rotation. Positioned between the grid wheel and the compass, and geared to the grid wheel for counter-rotation therewith, is a direction wheel having a transparent or translucent central area inscribed with at least one second directional arrow.

4 Claims, 5 Drawing Sheets

NAVIGATION AID WITH BIANGULATION

BACKGROUND OF THE INVENTION

1. Field of the Invention

This invention relates generally to navigation aids and devices, and particularly to a device for converting map bearings to provide an indication of the true land or sea bearing or position.

In reading a map and navigating with a compass, amateur or occasional navigators frequently fail to properly account for magnetic declination, either by neglecting it entirely, or by taking it in the wrong direction, thus producing an error of twice the magnetic declination. More seriously, amateur or occasional navigators may align the compass needle incorrectly or misinterpret the reading or make other similar errors to produce a 180 degree error.

There is a need for a navigation device which facilitates relatively foolproof conversion of map data into a land or sea bearing to be taken, and which permits determination of position by biangulation.

The principle of biangulation is of course well known, and involves taking bearings from two visible landmarks, and plotting those bearings back from the landmarks on a map, the intersection of the plots then indicating the person's position. Triangulation involves the same process, but is potentially slightly more accurate since averaging of three plots can be used. Unless very precise, such that all three plots intersect, triangulation will normally produce a very small triangle whose apexes are defined by the intersection points of the plots. For practical purposes, the person can assume that he or she is somewhere within that small triangle, if not at the center thereof.

2. Description of the Prior Art

Some prior art devices have used map transparencies mounted in a frame with a lens and rotatable grid, to facilitate obtaining a map bearing. For example, see U.S. Pat. No. 3,094,781 (Vangor, 1963).

However, such devices generally accomplish no more than can be accomplished using a protractor on a laid-out paper map, i.e. they merely provide a map bearing. There remains the problem of using a compass to convert the map bearing to the true land or sea bearing.

A navigation device similar to the present one is described in U.S. Pat. No. 5,060,390, by the same inventor. The device does not include the biangulation feature of the present invention, however.

SUMMARY OF THE INVENTION

It is an object of the invention to provide a navigation device which facilitates relatively foolproof conversion of map data into a land or sea bearing to be taken, and which permits biangulation, or possibly triangulation.

Thus in the invention, two grid wheels, a map transparency and a compass are combined such that map information can be directly converted to a land or sea bearings in virtually foolproof fashion.

More particularly, the invention involves, mounted in a case parallel to and aligned with each other, a lens across an opening at one end of the case and a compass, having a body, transparent faces and a magnetic compass needle, across an opening at the opposite end of the case. A transparency holder is positioned between the lens and the compass, adapted to receive a map transparency with magnetic north thereon aligning with a north marking on the body of the compass, at a distance from the lens approximating the focal length of the lens. Two grid wheels are provided between the transparency holder and the compass, each having a transparent central area inscribed with parallel grid lines and at least one first directional arrow aligned parallel to the grid lines, the grid wheels being in close proximity to the transparency holder such that they are also at a distance from the lens approximating the focal length of the lens. The grid wheels are normally fixed to each other so that they rotate together for taking of a single bearing, but are separable and independently rotatable when desired, so that two bearings may be taken for position determination by biangulation. A bearing may thus be taken by examining an installed map transparency through the lens, rotating the grid wheel and direction wheel to align the grid lines and the at least one first directional arrow with the desired direction of travel on the map, then aligning the compass needle with the north marking on the body of the compass, the at least one second directional arrow then indicating the bearing to be taken. For biangulation, the grid wheels may be rotated separately, one to the bearing to a first object and the other to the bearing to a second object. The position will be indicated by the intersection point of the grid lines which lead to the two objects.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
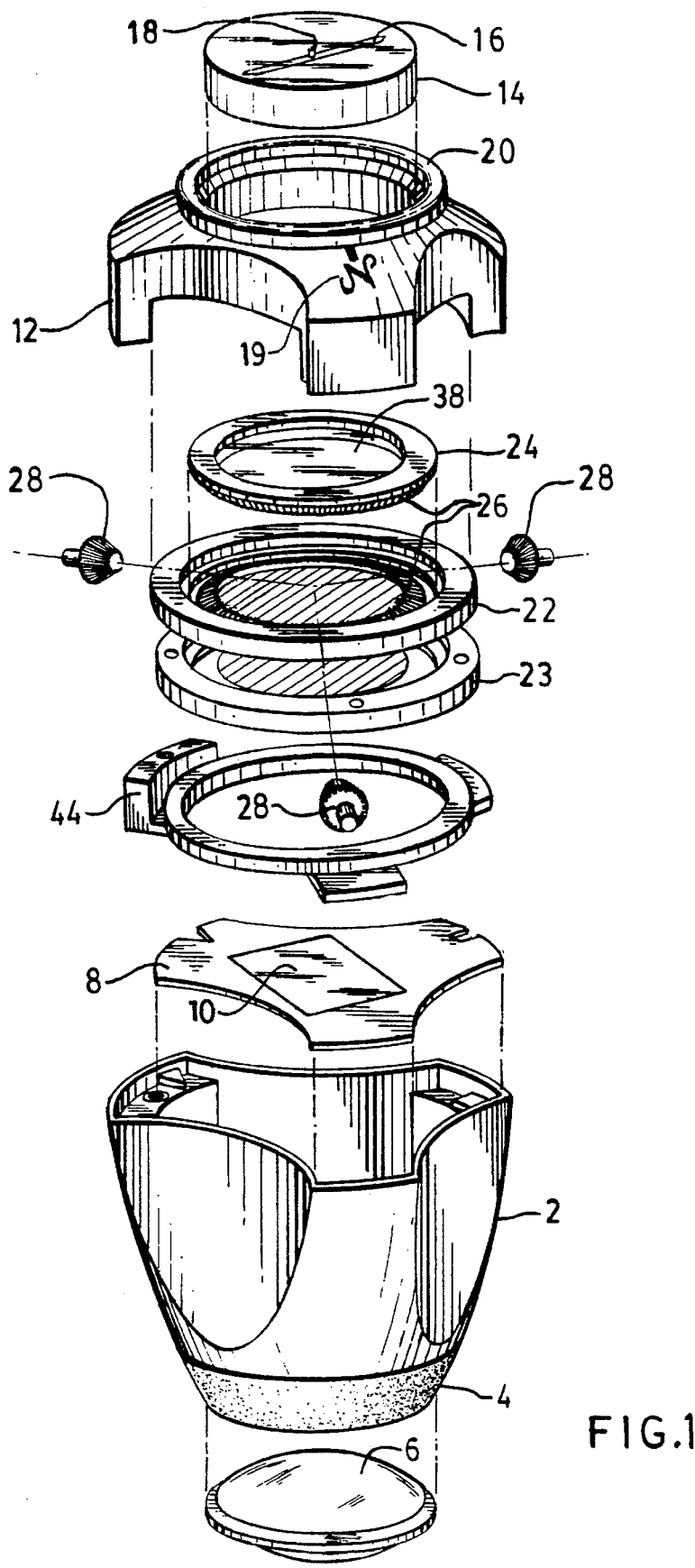
FIG. 1 is an exploded perspective, showing the various components of the device.
Figure 2:
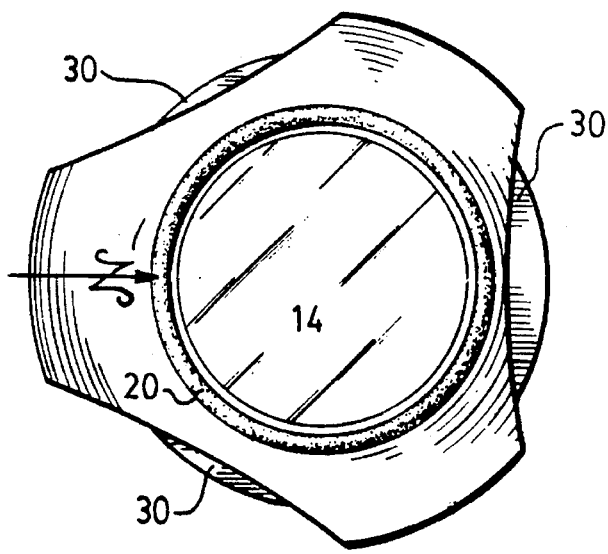
FIG. 2 is a top view.
Figure 3:
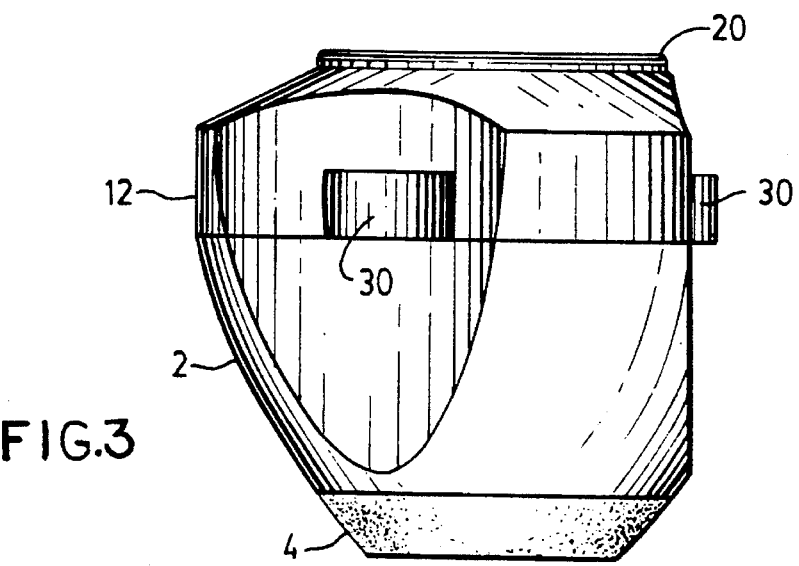
FIG. 3 is a front elevation.
Figure 4:
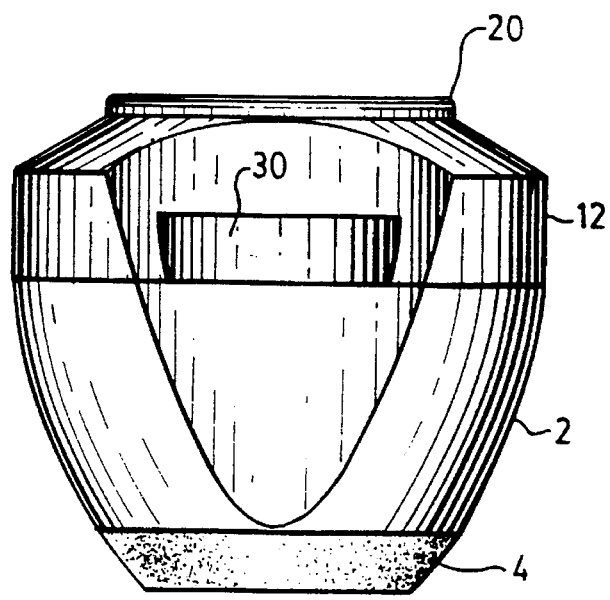
FIG. 4 is side elevation.
Figure 5:
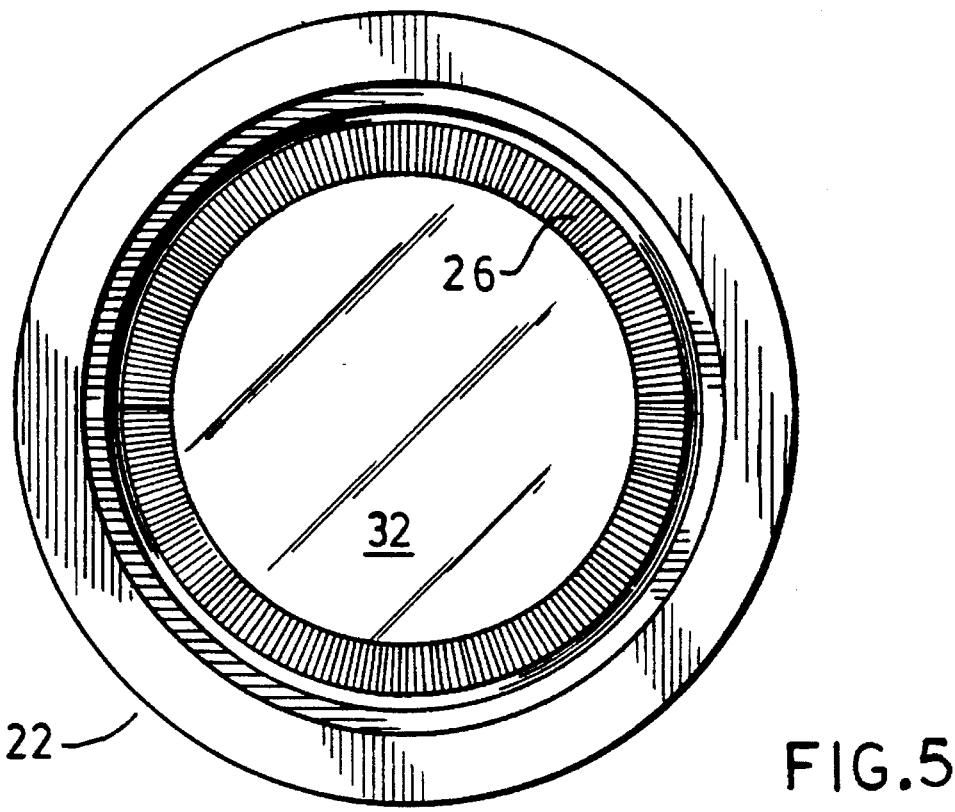
FIG. 5 is a top view of the grid ring.
Figure 6:
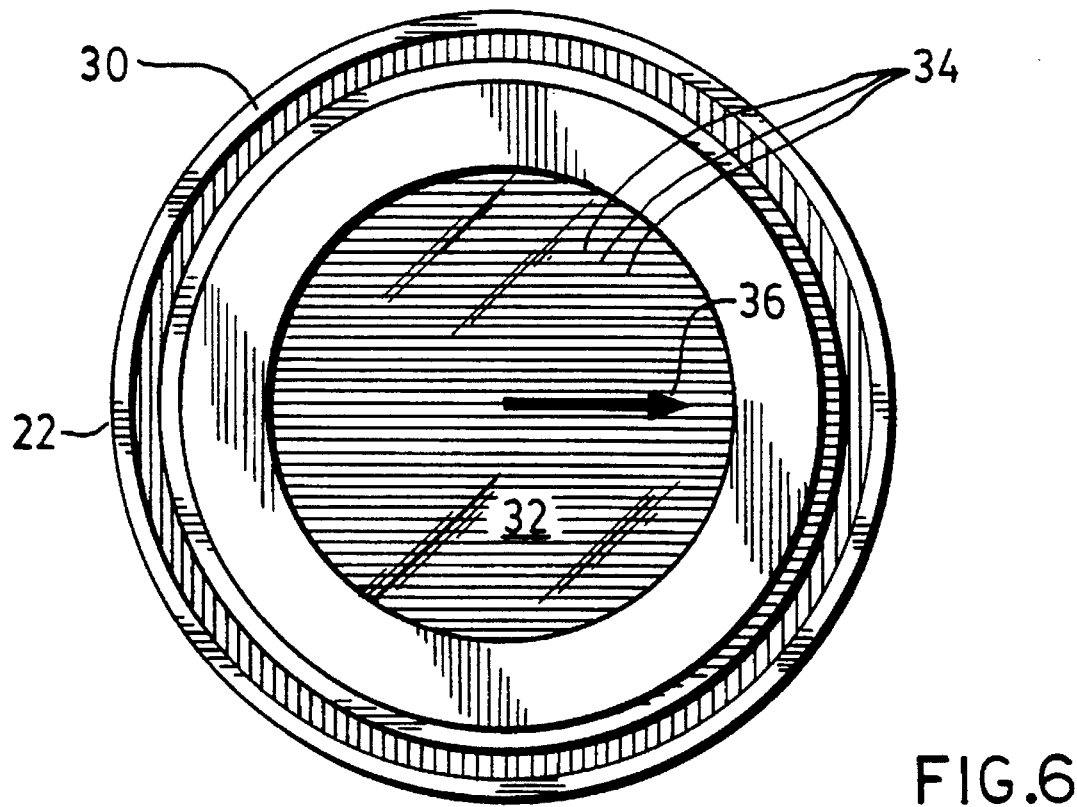
FIG. 6 is a bottom view of the grid ring.
Figure 7:
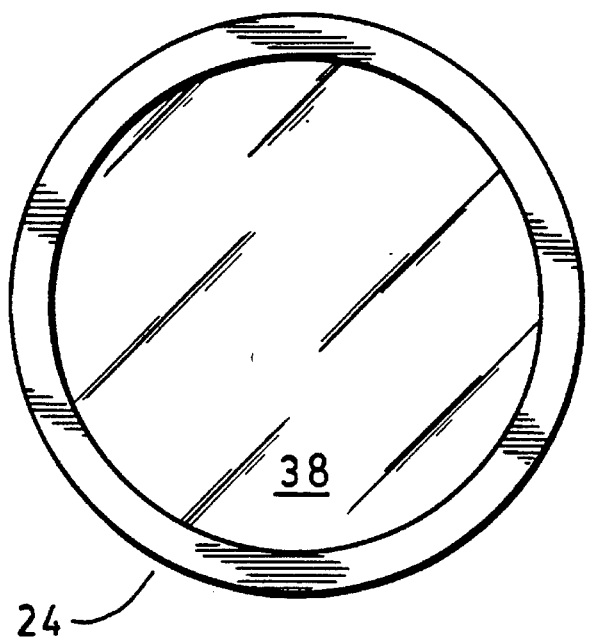
FIG. 7 is a top view of the direction ring.
Figure 8:
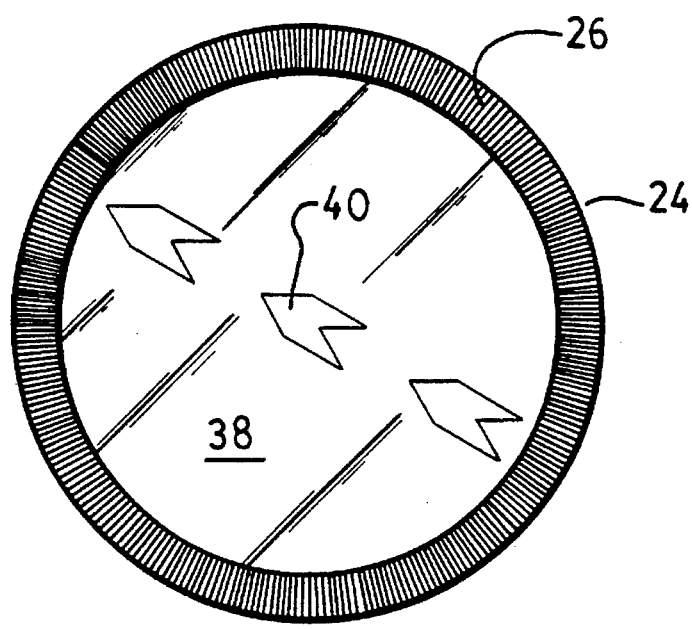
FIG. 8 is a bottom view of the direction ring.

In the preferred embodiment, the invention is embodied in a case, comprising a lower casing 2 and an upper casing 12. Mounted across the bottom end of the lower casing 2 in a rubber eye piece 4 is a lens 6. A transparency holder 8 is positioned across the upper end of the lower casing, to receive a map transparency 10. The transparency holder is at a distance from the lens approximating the focal length of the lens.

The upper casing 12 is removably fastened to the lower casing 2. A conventional compass 14, having a compass needle 16 mounted on a pin 18, is positioned across the upper end of the upper casing. A "North" or "N" marking, or other suitable indicator 19, is on the upper surface of the compass or, as illustrated in FIG. 1, on the upper casing adjacent the compass. A rubber ring 20 projects axially from the upper end of the upper casing to protect the casing and compass.

A first grid wheel 22 and a direction wheel 24 are mounted between the upper and lower casings. The wheels have gear-teethed areas 26. Small gears 28, preferably three in number, are evenly spaced in fixed positions between the gear-teethed areas, rotation of one wheel thus producing counter-rotation of the other.

Normally joined to the first grid wheel, for rotation therewith, is a second grid wheel 23. In the joined position, the grids marked on one grid wheel are parallel to the grids marked on the other grid wheel. Different colors may be used for the grids if desired.

Any suitable means may be used so that the grid wheels normally rotate together, but may be easily separated by the user so that they can rotate separately. For example, a ball-spring arrangement may be used, or a spring-loaded pin which may be retracted from a hole, or by any other suitable conventional means.

Either one of the grid wheels 22 or 23, or the direction wheel 24, has a ring portion 30 projecting outwardly from at least a portion of the upper and lower casings, for use by the user to rotate the grid wheels and direction wheel.

The grid wheels 22 and 23 both have a transparent central portion 32, inscribed with parallel grid lines 34 and at least one first directional arrow.36 aligned parallel to the grid lines. They are in close proximity to the transparency holder, such that they are also at a distance from the lens approximating the focal length of the lens. Thus when the user looks through the lens, both the map transparency and the grid lines are essentially in focus.

The direction wheel 24 has a transparent central portion 38 inscribed with at least one second directional arrow 40. Since it is spaced from the transparency and grid locations by virtue of the small gears 28, the second directional arrow 40 is not seen in focus.

The map transparency 10 must be prepared such that magnetic north is aligned with the N or North marking on the body of the compass.

The device is extremely simple to use. A bearing may be taken by looking at the map transparency through the lens 6, and manipulating the ring portion 30 so as to thereby rotate the grid wheel 22 and direction wheel 24, to align the grid lines and directional arrows thereon with the desired direction of travel on the map. Then the device is flipped over, and the compass needle is aligned with the North marking on the case (or on the body of the compass). The second directional arrow then indicates the bearing to be taken.

Figure 9:
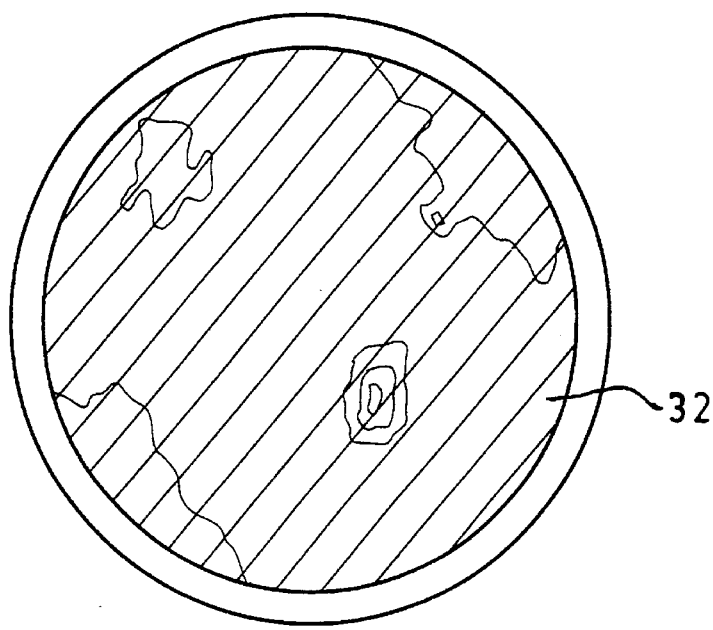
FIGS. 9 and 10 are illustrations of the principle of the grid wheels as used for biangulation.
Figure 10:
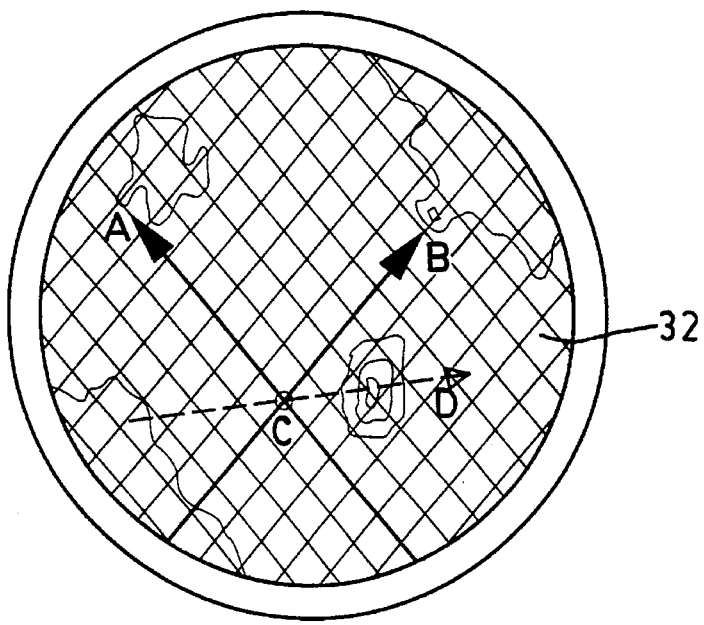

For biangulation, the above process is repeated, with the directional arrow on one grid wheel being aligned with a first landmark, and the directional arrow on the other grid wheel being aligned with a second landmark. When the user inverts the device, the user's position is indicated by the intersection of the respective grid lines which pass through the two landmarks, as shown in FIGS. 9 and 10. FIG. 9 shows the grid lines of the two grid wheels in alignment. FIG. 10 shows the crossing grid lines after the second grid wheel has been rotated relative to the first. Point C indicates the current position based on bearings taken to landmarks A and B, enabling a bearing to be taken to the target D.

It will be appreciated that the above description relates to the preferred embodiment by way of example only. Many variations on the invention will be obvious to those knowledgeable in the field, and such obvious variations are within the scope of the invention as described and claimed, whether or not expressly described.

The invention provides a navigation device which is quick and easy to use, as well as being virtually foolproof. In addition to facilitating the taking of accurate bearings, the invention facilitates determining positions by biangulation or triangulation.

What is claimed as the invention is:

1. A navigation device comprising, mounted in a case parallel to and aligned with each other, said case having openings at opposite ends thereof:

a lens across one said opening;

a compass across the other said opening, having a body, transparent faces and a magnetic compass needle;

a first grid wheel between said lens and said compass, having a transparent central area inscribed with at least one first directional arrow, at a distance from said lens approximating the focal length of the lens;

a second grid wheel immediately adjacent said first grid wheel, and releasably secured to said first grid wheel such that it normally rotates with said first grid wheel, but is readily separable therefrom for independent rotation, said second grid wheel also having a transparent central area inscribed with at least one second directional arrow, at a distance from said lens approximating the focal length of the lens;

positioned between said first grid wheel and said compass, and geared to said first grid wheel for counter-rotation therewith, a direction wheel having a transparent or translucent central area inscribed with at least one third directional arrow; and a transparency holder adapted to carry a map transparency with magnetic north thereon aligning with a north marking on said case or on the body of said compass, said transparency holder being in close proximity to said grid wheels such that it is also at a distance from the lens approximating the focal length of the lens.

2. A navigation device as recited in claim 1, in which each said grid wheel includes a plurality of grid lines across said transparent central area, parallel to said directional arrow.

3. A navigation device as recited in claim 1, in which said transparency holder is between said grid wheels and said lens.

4. A navigation device as recited in claim 2, in which said transparency holder is between said grid wheels and said lens.

* * * * *